(12) United States Patent
Anderson et al.

(10) Patent No.: US 11,986,849 B2
(45) Date of Patent: May 21, 2024

(54) AIR AMPLIFIER WITH NOISE SUPPRESSION

(71) Applicant: MSG Entertainment Group, LLC, New York, NY (US)

(72) Inventors: Robert Anderson, Levittown, NY (US); Erik Hockman, New York, NY (US); Stuart Elby, Westport, CT (US); Jeffery Lynn Wertz, Clermont, FL (US); Michael Allen Rives, Orlando, FL (US); Darik Wade Beaver, Clermont, FL (US)

(73) Assignee: MSG Entertainment Group, LLC, New York, NY (US)

( * ) Notice: Subject to any disclaimer, the term of this patent is extended or adjusted under 35 U.S.C. 154(b) by 628 days.

(21) Appl. No.: 17/150,794

(22) Filed: Jan. 15, 2021

(65) Prior Publication Data
US 2022/0228605 A1 Jul. 21, 2022

(51) Int. Cl.
*G10K 11/168* (2006.01)
*B05B 1/00* (2006.01)
(Continued)

(52) U.S. Cl.
CPC ............ *B05B 7/0087* (2013.01); *B05B 1/002* (2018.08); *B05B 1/005* (2013.01); *B32B 3/12* (2013.01);
(Continued)

(58) Field of Classification Search
CPC .. F01N 1/02; F04C 29/06; F04C 29/66; F04C 29/065; F04C 29/063; F04D 29/99; F04D 29/664; F04D 29/663
(Continued)

(56) References Cited

U.S. PATENT DOCUMENTS 4,023,645 A * 5/1977 Retka ............... F01N 1/023
181/276
4,199,936 A * 4/1980 Cowan ............... F01N 1/02
60/725
(Continued)

FOREIGN PATENT DOCUMENTS

WO WO 2019/121744 A1 6/2019

OTHER PUBLICATIONS

U.S. Appl. No. 16/997,518, filed Aug. 19, 2020, entitled "Atmospheric Effects Systems for Presenting Atmospheric Effects Relating to an Event".
(Continued)

*Primary Examiner* — Kien T Nguyen
(74) *Attorney, Agent, or Firm* — Sterne, Kessler, Goldstein & Fox P.L.L.C.

(57) ABSTRACT

Exemplary air amplifiers described herein can utilize a high-pressure stream of gas to accelerate a low-velocity stream of gas to provide a high-velocity, high-volume stream of gas. This high-velocity, high-volume stream of gas can generate unwanted noise as the high-velocity, high-volume stream of gas propagates through the air amplifier. The exemplary air amplifiers described herein can passively and/or actively suppress, for example, diminish, re-tune, or even completely cancel, the unwanted noise as the high-velocity, high-volume stream of gas propagates through these exemplary air amplifiers. The exemplary air amplifiers described herein can include one or more absorption materials to passively suppress the unwanted noise generated by the high-velocity, high-volume stream of gas. The exemplary air amplifiers described herein can generate multiple noise suppression waves to actively suppress the unwanted noise generated by the high-velocity, high-volume stream of gas. The multiple noise suppression waves can destructively combine with the unwanted noise generated by the high-
(Continued)

velocity, high-volume stream of gas to suppress the unwanted noise.

17 Claims, 12 Drawing Sheets

(51) Int. Cl.
    *B05B 7/00*     (2006.01)
    *B32B 3/12*     (2006.01)
    *B32B 3/26*     (2006.01)
    *F15D 1/08*     (2006.01)
    *F16L 55/033*     (2006.01)
    *G10K 11/172*     (2006.01)

(52) U.S. Cl.
    CPC ............... *B32B 3/266* (2013.01); *F15D 1/08* (2013.01); *F16L 55/0336* (2013.01); *G10K 11/168* (2013.01); *G10K 11/172* (2013.01); *B32B 2307/102* (2013.01)

(58) Field of Classification Search
    USPC ..................................................... 472/57, 64
    See application file for complete search history.

(56) References Cited

U.S. PATENT DOCUMENTS

| | | |
|---|---|---|
| 4,370,155 A | 1/1983 | Armbruster |
| 7,691,002 B2 | 4/2010 | Casey et al. |
| 8,336,261 B2 | 12/2012 | Hosking et al. |
| 9,307,841 B2 | 4/2016 | Jamele et al. |
| 2005/0284692 A1 | 12/2005 | McWilliam et al. |
| 2007/0119433 A1 | 5/2007 | Popik et al. |
| 2009/0014237 A1 | 1/2009 | Skowronski et al. |
| 2012/0131858 A1 | 5/2012 | Hosking et al. |
| 2015/0198150 A1 | 7/2015 | Streeter |
| 2015/0345497 A1 | 12/2015 | Lucas et al. |
| 2017/0074288 A1 | 3/2017 | Venugopal Setty et al. |
| 2017/0131858 A1 | 5/2017 | Gu |
| 2017/0191684 A1 | 7/2017 | Tompkins |
| 2017/0306845 A1 | 10/2017 | Laing et al. |
| 2020/0224810 A1 | 7/2020 | Hakuta et al. |
| 2021/0093742 A1 | 4/2021 | Miki |
| 2021/0293210 A1 | 9/2021 | Timme |

OTHER PUBLICATIONS

U.S. Appl. No. 16/997,511, filed Aug. 19, 2020, entitled "Air Amplifier Arrays for Presenting Atmospheric Effects Relating to an Event".

International Search Report and Written Opinion of the International Searching Authority directed to related International Application No. PCT/US2021/046479, dated Sep. 21, 2021; 7 pages.

International Search Report and Written Opinion of the International Searching authority directed to related International Application No. PCT/US22/12543, dated Apr. 4, 2022; 14 pages.

U.S. Appl. No. 17/682,969, entitled "Atmospheric Effects Systems for Presenting Atmospheric Effects Relating to an Event," filed Feb. 28, 2022.

\* cited by examiner

AIR AMPLIFIER WITH NOISE SUPPRESSION

BACKGROUND

The United States Media and Entertainment Industry is the largest in the world. The United States Media and Entertainment Industry represents a third of the global media and entertainment industry which delivers events, such as musical events, theatrical events, sporting events, and/or motion picture events, to an audience for their viewing pleasure. Operators of venues, such as music venues and/or sporting venues to provide some examples, have made many attempts to further enhance the immersion of the audience as they are viewing these events.

BRIEF DESCRIPTION OF THE DRAWINGS

Aspects of the present disclosure are best understood from the following detailed description when read with the accompanying figures. It is noted that, in accordance with the standard practice in the industry, features are not drawn to scale. In fact, the dimensions of the features may be arbitrarily increased or reduced for clarity of discussion.

DETAILED DESCRIPTION

Figure 1:
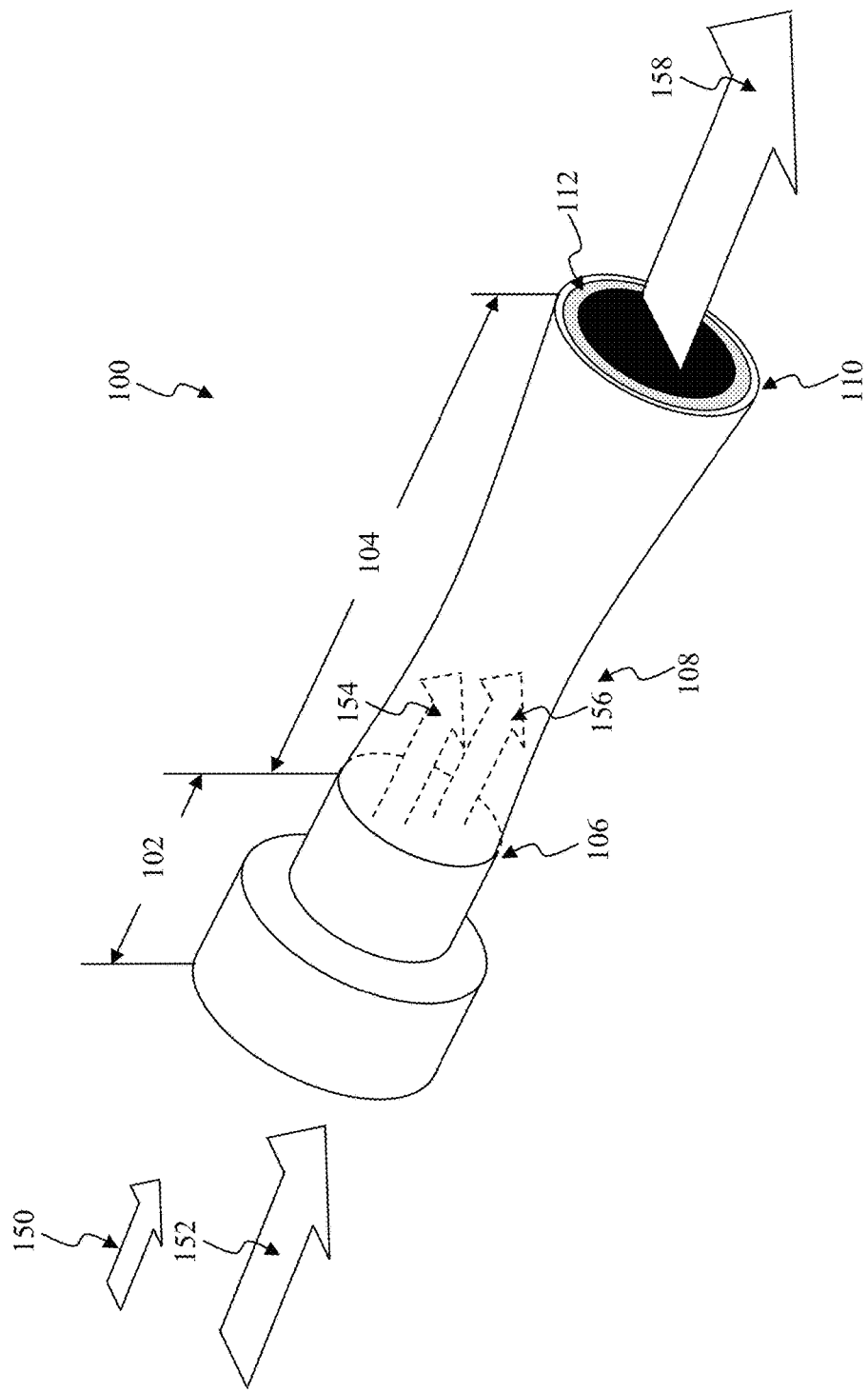
FIG. 1 graphically illustrates an exemplary air amplifier with noise suppression in accordance with some exemplary embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the examples. This repetition does not in itself dictate a relationship between the embodiments and/or configurations discussed.

Overview

Exemplary air amplifiers described herein can utilize a high-pressure stream of gas to accelerate a low-velocity stream of gas to provide a high-velocity, high-volume stream of gas. This high-velocity, high-volume stream of gas can generate unwanted noise as the high-velocity, high-volume stream of gas propagates through the air amplifier. The exemplary air amplifiers described herein can passively and/or actively suppress, for example, diminish, re-tune, or even completely cancel, the unwanted noise as the high-velocity, high-volume stream of gas propagates through these exemplary air amplifiers. The exemplary air amplifiers described herein can include one or more absorption materials to passively suppress the unwanted noise generated by the high-velocity, high-volume stream of gas. The exemplary air amplifiers described herein can generate multiple noise suppression waves to actively suppress the unwanted noise generated by the high-velocity, high-volume stream of gas. The multiple noise suppression waves can destructively combine with the unwanted noise generated by the high-velocity, high-volume stream of gas to suppress the unwanted noise Exemplary Air Amplifier with Noise Suppression FIG. 1 graphically illustrates an exemplary air amplifier with noise suppression in accordance with some exemplary embodiments. As illustrated in FIG. 1, an air amplifier 100 utilizes a high-pressure stream of gas to accelerate a low-velocity stream of gas to provide a high-velocity, high-volume stream of gas. These streams of gas, as well as other streams of gas as described herein, can include any gaseous element, compound, and/or mixture of elements and/or compounds, for example, ambient air. Moreover, these streams of gas, as well as other streams of gas as described herein, can additionally, or alternatively, include any elements, compounds, and/or mixtures of elements that are in a gaseous state, for example, water in its gaseous state, also referred to as steam. As to be described in further detail below, the high-velocity, high-volume stream of gas can generate unwanted noise as the high-velocity, high-volume stream of gas propagates through the air amplifier 100. As to be described in further detail below, the air amplifier 100 can include can suppress, for example, diminish, re-tune, or even completely cancel, the unwanted noise as the high-velocity, high-volume stream of gas propagates through the air amplifier 100. In the exemplary embodiment illustrated in FIG. 1, the air amplifier 100 can include an air amplification engine 102 and an air guide 104 that are to be described in further detail below.

The air amplification engine 102 utilizes energy from a high-pressure input stream of gas 150 to accelerate a low-velocity input stream of gas 152 to provide a high-velocity, high-volume input stream of gas 154. In some embodiments, the air amplification engine 102 can be implemented as an air volume amplifier or an air pressure amplifier. In these embodiments, the air volume amplifier and/or the air pressure amplifier can be implemented as a standard, also referred to as a fixed, air amplifier or an adjustable, also referred to as a variable, air amplifier.

The air guide 104 can shape the high-velocity, high-volume input stream of gas 154 as the high-velocity, high-volume input stream of gas 154 propagates through the air guide 104 to provide the high-velocity, high-volume output stream of gas 158. In some embodiments, the air guide 104 can be mechanically connected to the air amplification engine 102 with various fasteners, such as nuts, screws, bolts, rivets, pins, and/or lags to provide some examples. In some embodiments, the high-velocity, high-volume input stream of gas 154 can propagate along one or more surfaces of the air guide 104 as the high-velocity, high-volume input stream of gas 154 propagates through the air guide 104. In the exemplary embodiment illustrated in FIG. 1, the high-velocity, high-volume input stream of gas 154 can generate an unwanted noise 156 as the high-velocity, high-volume input stream of gas 154 propagates through the air amplifier 100. As to be described in further detail below, the air guide 104 can suppress for example, diminish, re-tune, or even completely cancel, the unwanted noise 156 generated by the high-velocity, high-volume input stream of gas 154. In some embodiments, the air guide 104 can implemented using one or more rigid materials, such as one or more metals, one or more plastic materials, and/or one or more fiberglass materials to provide some examples, to provide a rigid, or fixed, air guide and/or a non-rigid, flexible material to provide a moveable, or adjustable, air guide.

Generally, the air guide 104 can be characterized as being a three-dimensional shape including a hollow cavity for propagating and/or shaping the high-velocity, high-volume input stream of gas 154 as the high-velocity, high-volume input stream of gas 154 propagates through the air guide 104. As illustrated in FIG. 1, the air guide 104 can include an air inflow 106 to receive the high-velocity, high-volume input stream of gas 154 from the air amplification engine 102, an air duct 108 to shape the high-velocity, high-volume input stream of gas 154, and an air outflow 110 to further shape the high-velocity, high-volume input stream of gas 154 to provide the high-velocity, high-volume output stream of gas 158. Generally, the air inflow 106 is implemented using a regular closed geometric opening that is compatible with the air amplification engine 102 and the air outflow 110 is implemented using a regular closed geometric opening to further shape the high-velocity, high-volume input stream of 154 as the high-velocity, high-volume input stream of gas 154 is departing the air guide 104. In the exemplary embodiment illustrated in FIG. 1, the air guide 104 is implemented using circular openings at the air inflow 106 and the air outflow 110. In this exemplary embodiment, a diameter of the circular opening at the air inflow 106 is less than a diameter of the circular opening at the air outflow 110 such that the air duct 108 approximates a tapered conical cylinder. However, those skilled in the relevant art(s) will recognize that the air inflow 106 and/or the air outflow 110 can be implemented using other regular closed geometric structures, irregular closed structures, such as one or more irregular polygons to provide an example, and/or any suitable combination of closed structures that will be apparent to those skilled in the relevant art(s) without departing from the spirit and scope of the present disclosure. As illustrated in FIG. 1, the air duct 108 can be gradually tapered to provide an exponential decrease of its cross-sectional area and/or an exponential decrease of its cross-sectional area to form a conical horn shape. As the high-velocity, high-volume input stream of gas 154 propagates through the air duct 108, the high-velocity, high-volume input stream of gas 154 follows this horn shape which can shape the high-velocity, high-volume input stream of gas 154 to provide a truncated cone as the high-velocity, high-volume output stream of gas 158. However, those skilled in the relevant art(s) will recognize that the air duct 108 can be implemented using other configurations and arrangements to shape the high-velocity, high-volume input stream of gas 154 differently to provide other can shape for the high-velocity, high-volume output stream of gas 158 without departing from the spirit and scope of the present disclosure.

Moreover, as illustrated in FIG. 1, the air guide 104 can suppress the unwanted noise 156 generated by the high-velocity, high-volume input stream of gas 154 as the high-velocity, high-volume input stream of gas 154 propagates through the air amplifier 100. In some embodiments, the unwanted noise 156 generated by the high-velocity, high-volume input stream of gas 154 can be characterized being within a frequency range, for example, an audible frequency range, such as between approximately 20 Hz and approximately 20 kHz. In some embodiments, the air amplifier 100 can be used to provide one or more atmospheric effects relating to an event, such a musical event, a theatrical event, a sporting event, a motion picture, and/or any other suitable event that will be apparent to those skilled in the relevant art(s) without departing the spirit and scope of the present disclosure, as described in U.S. patent application Ser. No. 16/997,511, filed on Aug. 19, 2020, and U.S. patent application Ser. No. 16/997,518, filed on Aug. 19, 2020, each of which is incorporated herein by reference in its entirety. In these embodiments, the unwanted noise 156 generated by the high-velocity, high-volume input stream of gas 154 can diminish the experience of the audience observing the event. As an example, the unwanted noise 156 generated by the high-velocity, high-volume input stream of gas 154 can be characterized as being a whoosh, or whoosh-like, sound within the audible frequency range which can propagate, unless suppressed, to the audience as the audience is observing the event. In this example, this whoosh, or whoosh-like, sound can overwhelm the actual audible content of the event to diminish the experience of the audience observing the event.

In some embodiments, the air guide 104 can include one or more absorption materials to passively suppress the unwanted noise 156 generated by the high-velocity, high-volume input stream of gas 154. The one or more absorption materials can include one or more acoustic foams, also referred to as studio foams; one or more sound insulations, such as mineral wool, rock wool, and/or fiberglass to provide some examples; one or more acoustic fabrics; one or more acoustic coatings, such as Mass Loaded Vinyl (MLV) to provide an example; one or more acoustic paints; and/or any other suitable material that exhibits a non-resonant quality and is capable of absorbing the unwanted noise 156 generated by the high-velocity, high-volume input stream of gas 154 that will be apparent to those skilled in the relevant art(s) without departing the spirit and scope of the present disclosure. In some embodiments, the air guide 104 can generate multiple noise suppression waves to actively suppress the unwanted noise 156 generated by the high-velocity, high-volume input stream of gas 154. As to be described in further detail below, the high-velocity, high-volume input stream of gas 154 can cause the air guide 104 to resonate by, for example, Helmholtz resonance, to generate multiple noise suppression waves. In some embodiments, the multiple noise suppression waves can be characterized being within a frequency range, for example, an audible frequency range, such as between approximately 20 Hz and approximately 20 kHz. The multiple noise suppression waves can destructively combine with the unwanted noise 156 generated by the high-velocity, high-volume input stream of gas 154 to suppress the unwanted noise 156.

Figure 2:
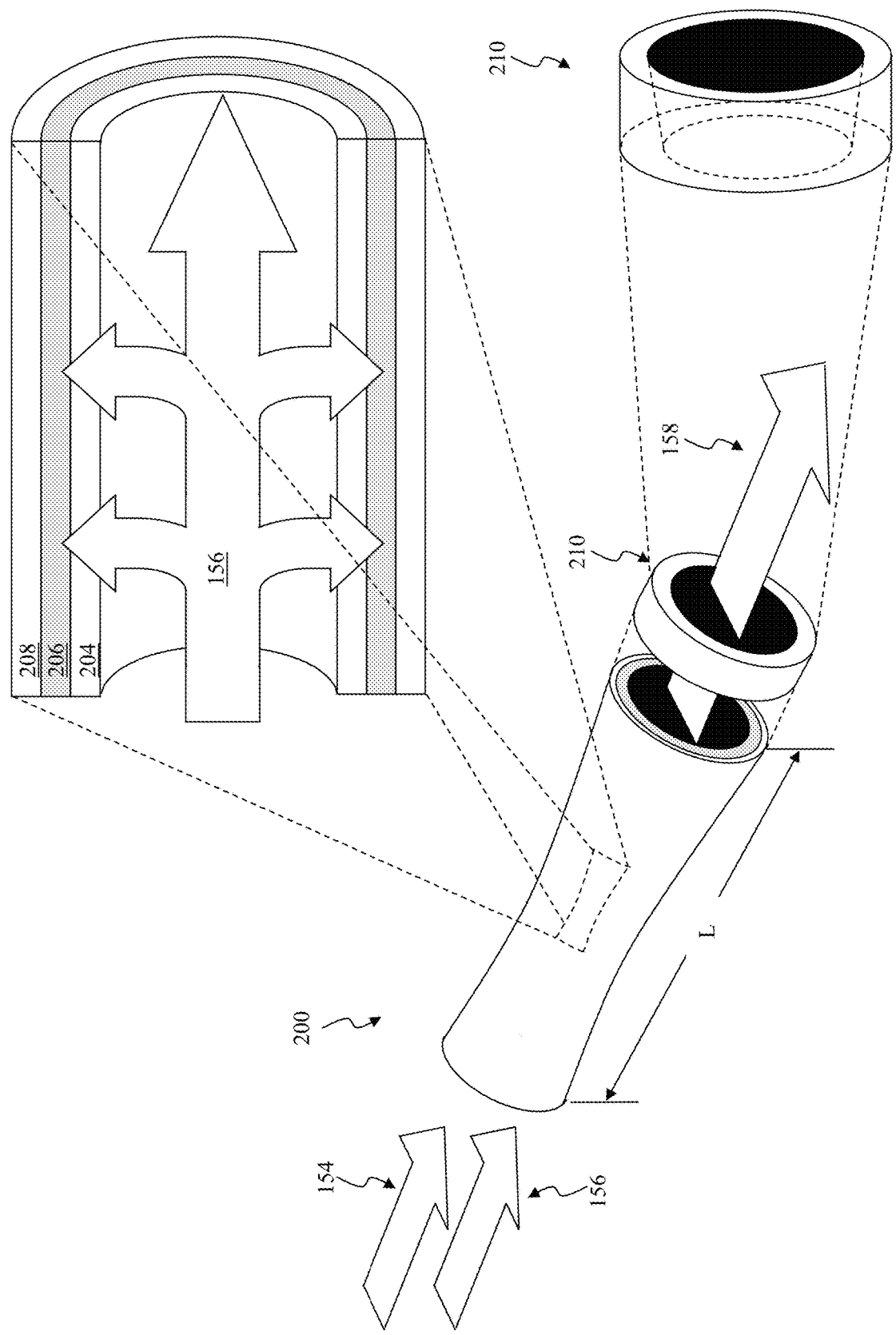
FIG. 2 graphically illustrates a first exemplary air guide that can be implemented within the exemplary air amplifier in accordance with some exemplary embodiments.

First Exemplary Air Guide that can be Implemented within the Exemplary Air Amplifier FIG. 2 graphically illustrates a first exemplary air guide that can be implemented within the exemplary air amplifier in accordance with some exemplary embodiments. In the exemplary embodiment illustrated in FIG. 2, an air guide 200 can be coupled to an amplification engine, such as the amplification engine 102 as described above in FIG. 1, which utilizes energy from a high-pressure input stream of gas to accelerate a low-velocity input stream of gas to provide the high-velocity, high-volume input stream of gas 154. The air guide 200 can shape the high-velocity, high-volume input stream of gas 154 as the high-velocity, high-volume input stream of gas 154 propagates through the air guide 200 to provide the high-velocity, high-volume output stream of gas 158 as described above in FIG. 1. And as described above, the high-velocity, high-volume input stream of gas 154 can generate the unwanted noise 156 as the high-volume input stream of gas 154 propagates through the air guide 200. As to be described in further detail below, the air guide 200 can be characterized as passively suppressing for example, diminishing, re-tuning, or even completely cancelling, the unwanted noise 156. As illustrated in FIG. 2, the air guide 200 can include a first inner faceplate 204, a passive acoustic absorption chamber 206, and a second outer faceplate 208. As to be described in further detail below, the first inner faceplate 204, the passive acoustic absorption chamber 206, and the second outer faceplate 208 are configured and arranged to implement a passive sound attenuator to passively suppress the unwanted noise 156. In some embodiments, the passive sound attenuator can be implemented as a dissipative silencer which suppresses the unwanted noise 156 by transferring the kinetic energy of the unwanted noise 156 into heat energy. The air guide 200 can represent an exemplary embodiment of the air guide 104 as described above in FIG. 1.

In the exemplary embodiment illustrated in FIG. 2, the first inner faceplate 204 forms an innermost assembly of the air guide 200. In the exemplary embodiment illustrated in FIG. 2, the air guide 200 can be characterized as having a hollow cavity along the longitudinal axis L. In some embodiments, the first inner faceplate 204 can be situated within the hollow cavity along a longitudinal axis L. However, those skilled in the relevant art(s) will recognize that the first inner faceplate 204 need not be situated along the longitudinal axis L in its entirety. In some embodiments, the first inner faceplate 204 can be situated along a portion of the longitudinal axis L. In some embodiments, the first inner faceplate 204 can have a uniform cross-sectional area along the longitudinal axis L of the air guide 200. For example, the first inner faceplate 204 can be characterized as being a cylindrical, or a cylindrical-like, shell that is situated within the hollow cavity. In some embodiments, the first inner faceplate 204 can have a non-uniform cross-sectional area along the longitudinal axis L of the air guide 200. For example, the first inner faceplate 204 can be characterized as being gradually thinned or narrowed towards an air inflow, such as the air inflow 106 as described above in FIG. 1, and/or an air outflow, such as the air outflow 110 as described above in FIG. 1, also referred to as being tapered, along the longitudinal axis L.

As illustrated in FIG. 2, the first inner faceplate 204 can shape the high-velocity, high-volume input stream of gas 154 as the high-velocity, high-volume input stream of gas 154 propagates through the air guide 200. In some embodiments, the first inner faceplate 204 can be implemented as a three-dimensional shape, such as a cube, a rectangular prism, a sphere, a cone, a cylinder, and/or any other suitable three-dimensional shape that will be apparent to those skilled in the relevant art(s) without departing from the spirit and scope of the present disclosure to provide some examples, having the hollow cavity along the longitudinal axis L. In the exemplary embodiment illustrated in FIG. 2, the high-velocity, high-volume input stream of gas 154 and the unwanted noise 156 traverse within the first inner faceplate 204. As illustrated in FIG. 2, the unwanted noise 156 can propagate through the first inner faceplate 204 onto the passive acoustic absorption chamber 206. In some embodiments, the first inner faceplate 204 can be implemented using one or more metallic materials, such as iron, steel, copper, bronze, brass, or aluminum to provide some examples, one or more non-metallic materials, such as wood, plastic, or glass, and/or any combination thereof. In some embodiments, the first inner faceplate 204 can include one or more perforations to allow the unwanted noise 156 to propagate through the first inner faceplate 204 onto the passive acoustic absorption chamber 206. In these embodiments, the one or more perforations can be implemented using one or more regular closed geometric openings, such as ellipses, hexagons, and/or diamonds to provide some examples, within the first inner faceplate 204 that are free of the one or more metallic materials and/or the one or more non-metallic materials. However, those skilled in the relevant art(s) will recognize that the one or more perforations can be implemented using other regular closed geometric structures, irregular closed structures, such as one or more irregular polygons to provide an example, and/or any suitable combination of closed structures that will be apparent to those skilled in the relevant art(s) without departing from the spirit and scope of the present disclosure. In some embodiments, the one or more perforations can be substantially similar to one another throughout the first inner faceplate 204, differ from one another throughout the first inner faceplate 204, and/or any combination thereof. In some embodiments, one or more regions of the first inner faceplate 204 can have substantially similar perforations that differ from perforations in other regions of the first inner faceplate 204.

In the exemplary embodiment illustrated in FIG. 2, the passive acoustic absorption chamber 206 can be situated between the first inner faceplate 204 and the second outer faceplate 208. As described above, the air guide 200 can be characterized as having a hollow cavity along the longitudinal axis L. In some embodiments, the passive acoustic absorption chamber 206 can be situated within the hollow cavity along the longitudinal axis L. However, those skilled in the relevant art(s) will recognize that the passive acoustic absorption chamber 206 need not be situated along the longitudinal axis L in its entirety. In some embodiments, the passive acoustic absorption chamber 206 can be situated along a portion of the longitudinal axis L. In some embodiments, the passive acoustic absorption chamber 206 can have a uniform cross-sectional area along the longitudinal axis L of the air guide 200. For example, the passive acoustic absorption chamber 206 can be characterized as being a cylindrical, or a cylindrical-like, shell that is situated within the hollow cavity. In some embodiments, the passive acoustic absorption chamber 206 can have a non-uniform cross-sectional area along the longitudinal axis L of the air guide 200. For example, the passive acoustic absorption chamber 206 can be characterized as being gradually thinned or narrowed towards an air inflow, such as the air inflow 106 as described above in FIG. 1, and/or an air outflow, such as the air outflow 110 as described above in FIG. 1, also referred to as being tapered, along the longitudinal axis L.

In the exemplary embodiment illustrated in FIG. 2, the passive acoustic absorption chamber 206 can passively suppress, namely, absorb, the unwanted noise 156 propagating through the air guide 200. As illustrated in FIG. 2, the unwanted noise 156 can collide with the first inner faceplate 204 as the unwanted noise 156 propagates through the air guide 200. Each collision between the unwanted noise 156 and the first inner faceplate 204 can cause some of the unwanted noise 156 to propagate through the first inner faceplate 204 onto the passive acoustic absorption chamber 206 and some of the unwanted noise 156 to continue to propagate through the air guide 200. Thereafter, some of the unwanted noise 156 which propagates through the first inner faceplate 204 can be suppressed, namely, absorbed, by the passive acoustic absorption chamber 206 and/or some of the unwanted noise 156 which propagates through the first inner faceplate 204 can continue propagate through the passive acoustic absorption chamber 206 onto the second outer faceplate 208. In some embodiments, the passive acoustic absorption chamber 206 can transfer the kinetic energy of the unwanted noise 156 into heat energy to suppress the unwanted noise 156. In some embodiments, the amount of the unwanted noise 156 that is absorbed by the passive acoustic absorption chamber 206 can be related to one or more acoustic impedances of the passive acoustic absorption chamber 206, a wavelength of the unwanted noise 156, and/or an incident angle between the unwanted noise 156 and the first inner faceplate 204. In some embodiments, the passive acoustic absorption chamber 206 can include one or more porous sound absorption materials such as acoustic foams, also referred to as studio foams; one or more sound insulations, such as mineral wool, rock wool, and/or fiberglass to provide some examples; one or more acoustic fabrics; one or more acoustic coatings, such as Mass Loaded Vinyl (MLV) to provide an example; one or more acoustic paints; and/or any other suitable material that is capable of absorbing the unwanted noise propagating through the passive acoustic absorption chamber 206.

In the exemplary embodiment illustrated in FIG. 2, the second outer faceplate 208 forms an outermost assembly of the air guide 200. As described above, the air guide 200 can be characterized as having a hollow cavity along the longitudinal axis L. In some embodiments, the second outer faceplate 208 can be situated along the longitudinal axis L. In other embodiments, the three-dimensional shape of the second outer faceplate 208 can be different from the three-dimensional shape of the first inner faceplate 204. In some embodiments, the second outer faceplate 208 can be implemented as a three-dimensional shape, such as a cube, a rectangular prism, a sphere, a cone, a cylinder, and/or any other suitable three-dimensional shape that will be apparent to those skilled in the relevant art(s) without departing from the spirit and scope of the present disclosure to provide some examples having a hollow cavity. In some embodiments the three-dimensional shape of the second outer faceplate 208 can be substantially similar to the three-dimensional shape of the first inner faceplate 204. Moreover, as described above, some of the unwanted noise 156 which propagates through the first inner faceplate 204 can propagate through the passive acoustic absorption chamber 206 onto the second outer faceplate 208. In some embodiments, the second outer faceplate 208 can reflect the unwanted noise 156 that propagates through the passive acoustic absorption chamber 206 back onto the passive acoustic absorption chamber 206. In these embodiments, the second outer faceplate 208 can be implemented using one or more acoustically reflective materials, such as the one or more metallic materials as described above, the one or more non-metallic materials as described above, and/or any combination thereof. In some embodiments, the second outer faceplate 208 can be implemented using sufficiently dense materials from among the one or more non-metallic materials which can prevent the second outer faceplate 208 from resonating as the unwanted noise 156 propagates through the air guide 200.

In the exemplary embodiment illustrated in FIG. 2, the air guide 200 can optionally include an endcap 210 to secure the first inner faceplate 204, the passive acoustic absorption chamber 206, and the second outer faceplate 208 within the air guide 200 as the high-velocity, high-volume input stream of gas 154 propagates through the air guide 200. As illustrated in FIG. 2, the endcap 210 can be implemented 210 can be implemented as a cylindrical shape having a hollow cavity of a truncated cone formed therein. However, those skilled in the relevant art(s) will recognize that the endcap 210 and/or the hollow cavity formed therein can be implemented using other three-dimensional shapes, such as cubes, rectangular prisms, cylinders, and/or spheres to provide some examples, without departing from the spirit and scope of the present disclosure. In some embodiments, the endcap 210 can be configured and arranged to be mechanically connected to the second outer faceplate 208 with various fasteners, such as nuts, screws, bolts, rivets, pins, and/or lags to provide some examples. In some embodiments, a cross-sectional area of the endcap 210 is greater than a cross sectional area of the second outer faceplate 208 at an air outflow, such as the air outflow 110 as described above in FIG. 1, of the air guide 200 to allow the endcap 210 to effectively slide over the second outer faceplate 208. In the exemplary embodiment illustrated in FIG. 2, the endcap 210 can include an opening, or hole, to allow the high-velocity, high-volume input stream of gas high-volume 154 to propagate through the air guide 200. In some embodiments, a cross-sectional area of the opening, or hole, of the endcap 210 is less than or equal to a cross sectional area of the first inner faceplate 204 at the air outflow to secure the first inner faceplate 204, the passive acoustic absorption chamber 206, and the second outer faceplate 208 within the air guide 200.

Figure 3A:
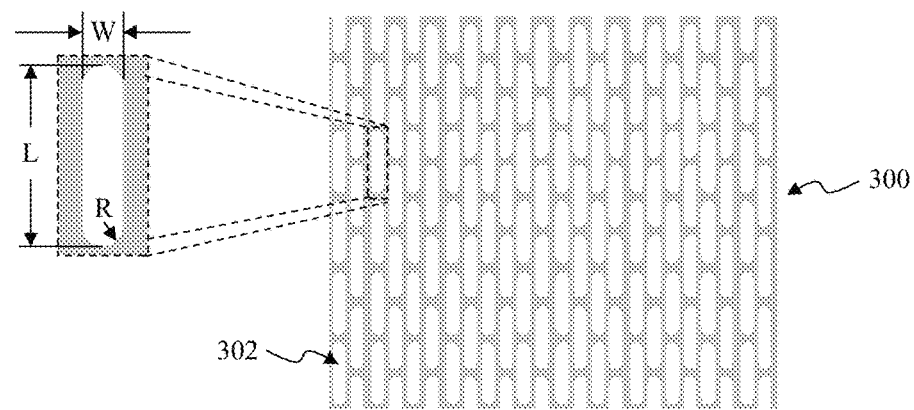
FIG. 3A through FIG. 3C graphically illustrate exemplary inner faceplates that can be implemented within the first exemplary air guide in accordance with some exemplary embodiments.
Figure 3B:
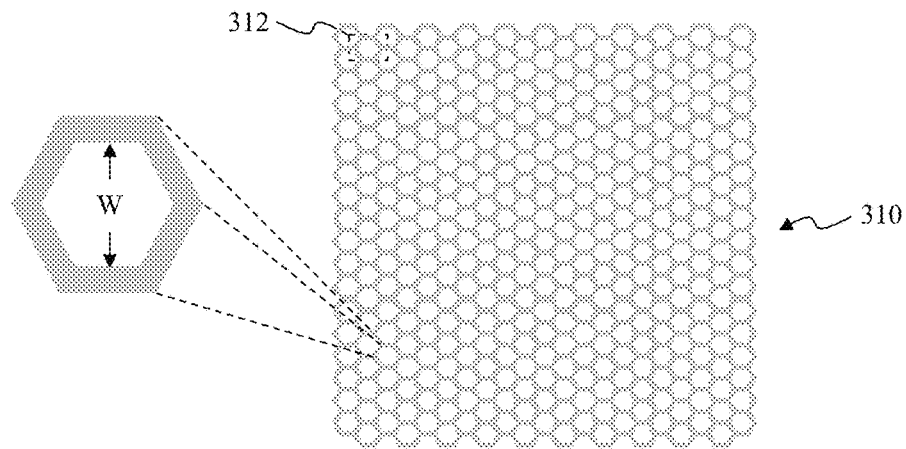
Figure 3C:
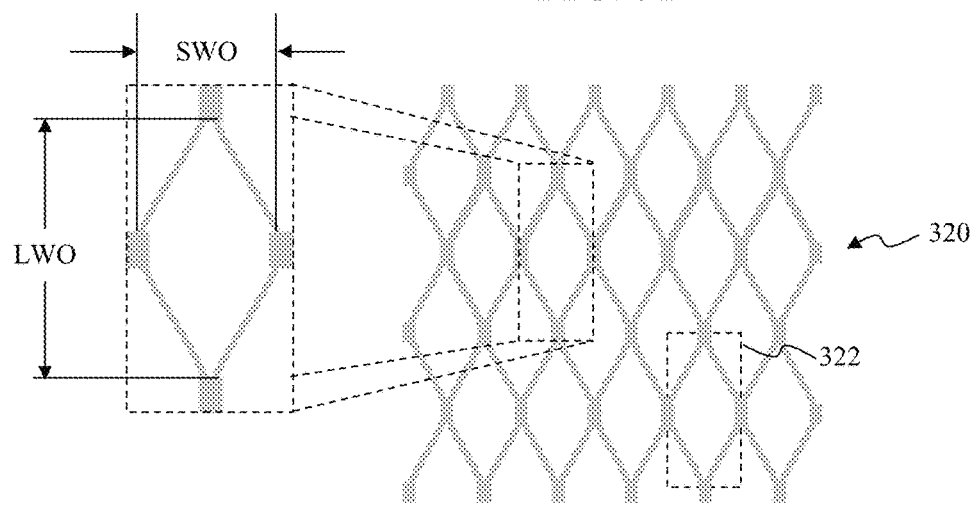

Exemplary Inner Faceplates that can be Implemented within the First Exemplary Air Guide FIG. 3A through FIG. 3C graphically illustrate exemplary inner faceplates that can be implemented within the first exemplary air guide in accordance with some exemplary embodiments. As described above in FIG. 2, a first inner faceplate, such as the first inner faceplate 204 to provide an example, can include one or more perforations to allow the unwanted noise 156 to propagate through the first inner faceplate onto an acoustic absorption chamber, such as the passive acoustic absorption chamber 206 to provide an example. The discussion of FIG. 3A through FIG. 3C to follow is to describe various configurations and arrangements of materials that can be used to implement the first inner faceplate. However, the first inner faceplate is not limited to the materials as described in FIG. 3A through 3C. Those skilled in the relevant art(s) will recognize that other materials having other perforations can be used to implement the first inner faceplate without departing from the spirit and scope of the present disclosure.

As illustrated in FIG. 3A, a slotted sheet material 300 of one or more metallic materials, such as iron, steel, copper, bronze, brass, or aluminum to provide some examples, one or more non-metallic materials, such as wood, plastic, or glass, and/or any combination thereof can be configured and arranged to form the first inner faceplate. In an exemplary embodiment, the slotted sheet material 300 has an approximate thickness of 0.0299 inches, which corresponds to 22 Gauge. In the exemplary embodiment illustrated in FIG. 3A, the sheet material 300 can include one or more elliptical perforations 302 to allow the unwanted noise 156 to propagate through the first inner faceplate onto the acoustic absorption chamber. In an exemplary embodiment, the slotted sheet material 300 can include approximately 4.76 elliptical perforations 302 per square inch. In some embodiments, the one or more elliptical perforations 302 can be characterized as being in one or more columns and one or more rows to form an array of elliptical perforations. As illustrated in FIG. 3A, the one or more elliptical perforations 302 in each row of elliptical perforations from among the array of elliptical perforations are side staggered from one or more neighboring, adjacent rows of elliptical perforations from among the array of elliptical perforations. Moreover, as illustrated in FIG. 3A, the one or more elliptical perforations 302 can be characterized as having a longitudinal axis L, a width W, and a radius R. In an exemplary embodiment, the longitudinal axis L is approximately 0.75 inches, the width W is approximately 0.125 inches, and the radius R is approximately 0.125 inches.

As illustrated in FIG. 3B, a hexagonal sheet material 310 of the one or more metallic materials, the one or more non-metallic materials and/or any combination thereof can be configured and arranged to form the first inner faceplate. In an exemplary embodiment, the hexagonal sheet material 310 has an approximate thickness of 0.0299 inches, which corresponds to 22 Gauge. In the exemplary embodiment illustrated in FIG. 3B, the hexagonal sheet material 310 can include one or more hexagonal perforations 312 to allow the unwanted noise 156 to propagate through the first inner faceplate onto the acoustic absorption chamber. In an exemplary embodiment, the hexagonal sheet material 310 can include approximately 16.09 hexagonal perforations 312 per square inch. In some embodiments, the one or more hexagonal perforations 312 can be characterized as being in one or more columns and one or more rows to form an array of hexagonal perforations. As illustrated in FIG. 3B, the one or more hexagonal perforations 312 in each row of hexagonal perforations from among the array of hexagonal perforations are staggered from one or more neighboring, adjacent rows of hexagonal perforations from among the array of hexagonal perforations by, for example, approximately 0.28125 inches center to center at approximately 60 degrees. Moreover, as illustrated in FIG. 3B, the one or more hexagonal perforations 312 can be characterized as having a side-to-side width W. In an exemplary embodiment, the side-to-side width W is approximately 0.25 inches.

As illustrated in FIG. 3C, a diamond sheet material 320 of the one or more metallic materials, the one or more non-metallic materials and/or any combination thereof can be configured and arranged to form the first inner faceplate. In an exemplary embodiment, the diamond sheet material 320 has an approximate thickness of 0.0299 inches, which corresponds to 22 Gauge. In the exemplary embodiment illustrated in FIG. 3B, the diamond sheet material 320 can include one or more diamond perforations 322 to allow the unwanted noise 156 to propagate through the first inner faceplate onto the acoustic absorption chamber. In an exemplary embodiment, the diamond sheet material 320 can include approximately 9.0 diamond perforations 322 per square foot horizontally, referred to as short way, and approximately 3.8 diamond perforations 322 per square foot vertically, referred to as long way. In some embodiments, the one or more diamond perforations 322 can be characterized as being in one or more columns and one or more rows to form an array of diamond perforations. As illustrated in FIG. 3B, the one or more diamond perforations 322 in each row of diamond perforations from among the array of diamond perforations are staggered from one or more neighboring, adjacent rows of diamond perforations from among the array of diamond perforations. Moreover, as illustrated in FIG. 3B, the one or more diamond perforations 322 can be characterized as having a short way of perforation (SWO) and a long way of perforation (LWO). In an exemplary embodiment, the SWO is approximately 1.092 inches and the LWO is approximately 2.750 inches.

Figure 4:
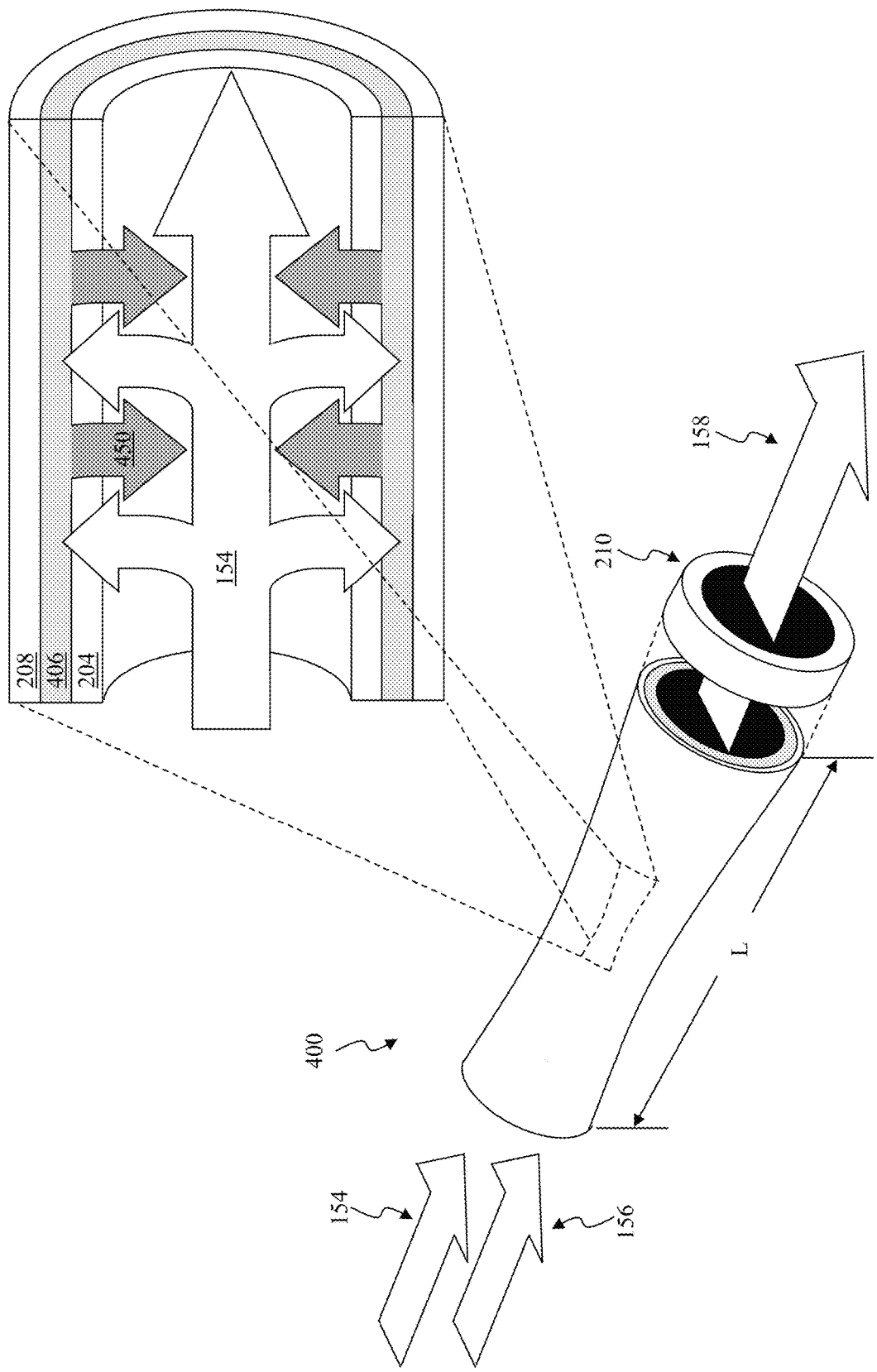
FIG. 4 graphically illustrates a second exemplary air guide that can be implemented within the exemplary air amplifier in accordance with some exemplary embodiments.

Second Exemplary Air Guide that can be Implemented within the Exemplary Air Amplifier FIG. 4 graphically illustrates a second exemplary air guide that can be implemented within the exemplary air amplifier in accordance with some exemplary embodiments. In the exemplary embodiment illustrated in FIG. 4, an air guide 400 can be coupled to an amplification engine, such as the amplification engine 102 as described above in FIG. 1, which utilizes energy from a high-pressure input stream of gas to accelerate a low-velocity input stream of gas to provide the high-velocity, high-volume input stream of gas 154 in a substantially similar manner as described above in FIG. 1. In the exemplary embodiment illustrated in FIG. 4, the air guide 400 can shape the high-velocity, high-volume input stream of air 154 as the high-velocity, high-volume input stream of gas 154 propagates through the air guide 400 to provide the high-velocity, high-volume output stream of gas 158 as described above in FIG. 1. And as described above, the high-velocity, high-volume input stream of gas 154 can generate the unwanted noise 156 as the high-volume input stream of gas 154 propagates through the air guide 400. As to be described in further detail below, the air guide 400 can be characterized as actively suppressing for example, diminishing, re-tuning, or even completely cancelling, the unwanted noise 156. As illustrated in FIG. 4, the air guide 400 can include the first inner faceplate 204 and the second outer faceplate 208 as described above in FIG. 2 and an active acoustic suppression chamber 406. As to be described in further detail below, the first inner faceplate 204, the active acoustic suppression chamber 406, and the second outer faceplate 208 are configured and arranged to implement an active sound attenuator to actively suppress the unwanted noise 156. In some embodiments, the active acoustic suppression chamber can generate one or more noise suppression waves which destructively combine with the unwanted noise 156 to suppress the unwanted noise 156. The air guide 400 can represent an exemplary embodiment of the air guide 104 as described above in FIG. 1. The air guide 400 shares many substantially features as the air guide 200 as described above in FIG. 2; therefore, only differences between the air guide 400 and the air guide 200 are to be described in further detail below.

As illustrated in FIG. 4, the active acoustic suppression chamber 406 can be situated within the air guide 400 in a substantially similar manner as the passive acoustic absorption chamber 206 can be situated within the air guide 200 as described above in FIG. 2. In the exemplary embodiment illustrated in FIG. 4, the active acoustic suppression chamber 406 can actively suppress the unwanted noise 156 propagating through the air guide 200. As illustrated in FIG. 4, the high-volume input stream of gas 154 propagates through the air guide 400, for example, along one or more surfaces of the first inner faceplate 204. In some embodiments, the first inner faceplate 204 can include the one or more perforations as described above in FIG. 2 to allow some of the high-volume input stream of gas 154 to propagate through the first inner faceplate 204 onto the active acoustic suppression chamber 406. Thereafter, the high-volume input stream of gas 154 which propagates through the first inner faceplate 204 can cause the active acoustic suppression chamber 406 to resonate by, for example, Helmholtz resonance, to generate multiple noise suppression waves 450. In some embodiments, the active acoustic suppression chamber 406 can be effectively tuned to resonate at one or more resonant frequencies. In these embodiments, the high-volume input stream of gas 154 which propagates through the first inner faceplate 204 can cause the ambient air within the active acoustic suppression chamber 406 to vibrate at the one or more resonant frequencies to generate the multiple noise suppression waves 450 at these resonant frequencies. In some embodiments, these resonant frequencies can be within a frequency range, for example, an audible frequency range, such as between approximately 20 Hz and approximately 20 kHz. In some embodiments, the multiple noise suppression waves 450 can destructively combine with the unwanted noise 156 generated by the high-velocity, high-volume input stream of gas 154 to suppress the unwanted noise 156.

Exemplary Active Acoustic Suppression Chambers that can be Implemented within the Second Exemplary Air Guide FIG. 5A through FIG. 5E graphically illustrate various exemplary active acoustic suppression chambers that can be implemented within the second exemplary air guide in accordance with some exemplary embodiments. In the exemplary embodiment illustrated in FIG. 5A, an active acoustic suppression chamber 504 can be situated between a first inner faceplate 502 and a second outer faceplate 506. In some embodiments, the first inner faceplate 502, the active acoustic suppression chamber 504, and the second outer faceplate 506 can represent portions of the inner faceplate 204, the active acoustic suppression chamber 406, and the second outer faceplate 208, respectively, as described above. As to be described in further detail below, the active acoustic suppression chamber 504 can use the high-velocity, high-volume input stream of gas 154 to generate multiple noise suppression waves which destructively combine with the unwanted noise 156 to actively suppress the unwanted noise 156.

Figure 5A:
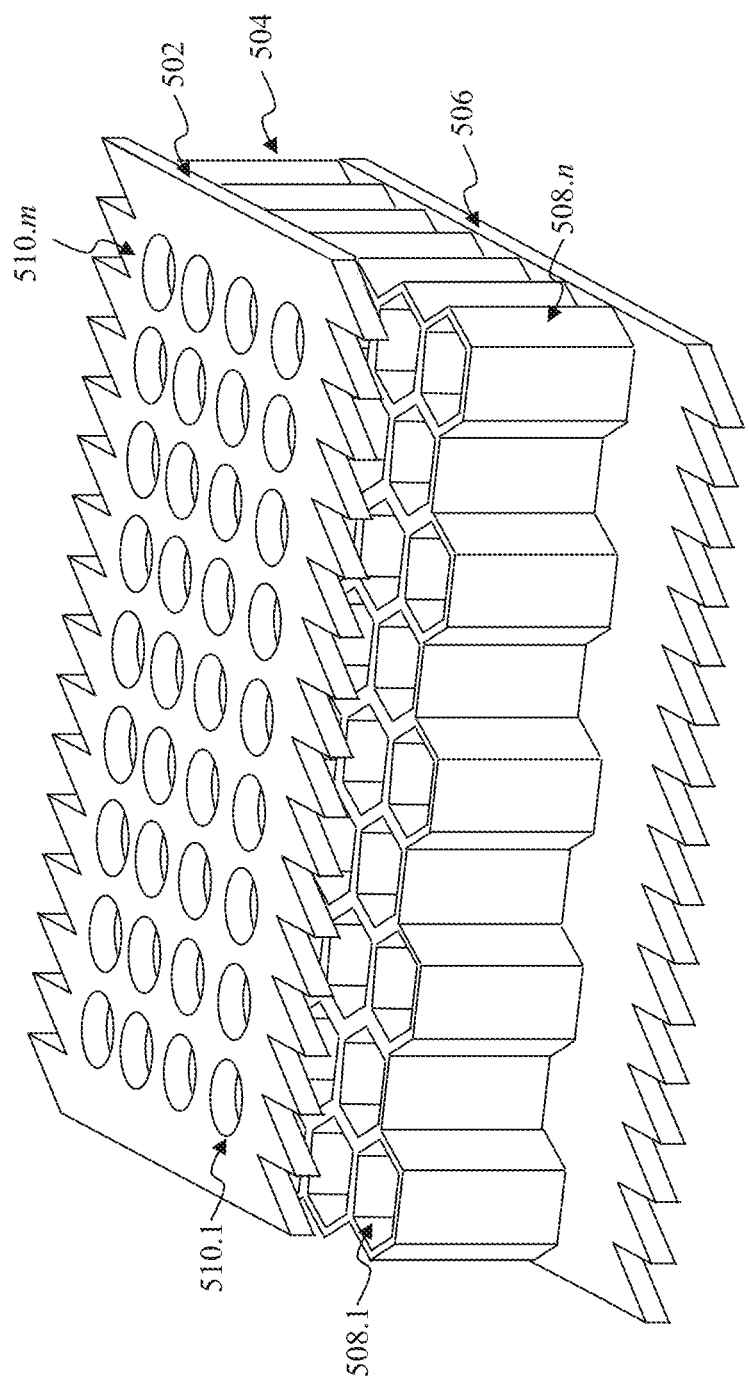
FIG. 5A through FIG. 5E graphically illustrate various exemplary active acoustic suppression chambers that can be implemented within the second exemplary air guide in accordance with some exemplary embodiments.

In the exemplary embodiment illustrated in FIG. 5A, the active acoustic suppression chamber 504 can include acoustic suppression elements 508.1 through 508.n. As illustrated in FIG. 5A, the acoustic suppression elements 508.1 through 508.n can be configured and arranged as a series of rows and/or a series of columns to form an array of acoustic suppression elements. In some embodiments, each acoustic suppression element from among the acoustic suppression elements 508.1 through 508.n can be offset, or staggered, from its one or more neighboring, adjacent acoustic suppression elements from among the acoustic suppression elements 508.1 through 508.n to form a two-dimensional lattice of acoustic suppression elements. The two-dimensional lattice can include a rhombic lattice, a square lattice, a rectangular lattice, a parallelogrammic lattice, a triangular lattice, a hexagonal lattice, or any other suitable two-dimensional lattice that will be apparent to those skilled in the relevant art(s) without departing from the spirit and scope of the present disclosure. In some embodiments, the acoustic suppression elements 508.1 through 508.n can be implemented using one or more metallic materials, such as iron, steel, copper, bronze, brass, or aluminum to provide some examples, one or more non-metallic materials, such as wood, plastic, or glass, and/or any combination thereof.

In the exemplary embodiment illustrated in FIG. 5A, the acoustic suppression elements 508.1 through 508.n can be effectively tuned to resonate at one or more resonant frequencies in a substantially similar manner as described above in FIG. 4. In some embodiments, the high-volume input stream of gas 154 can propagate along one or more surfaces of the first inner faceplate 504. As illustrated in FIG. 5A, the first inner faceplate 504 can include the one or more perforations 510.1 through 510.m to allow some of the high-volume input stream of gas 154 to propagate through the first inner faceplate 504 onto the acoustic suppression elements 508.1 through 508.n. Thereafter, the high-volume input stream of gas 154 which propagates through the one or more perforations 510.1 through 510.m can cause the acoustic suppression elements 508.1 through 508.n to resonate by, for example, Helmholtz resonance, to generate multiple noise suppression waves, such as the multiple noise suppression waves 450 as described above in FIG. 4.

In the exemplary embodiment illustrated in FIG. 5A, the high-volume input stream of gas 154 which propagates through the one or more perforations 510.1 through 510.m can cause the ambient air within the acoustic suppression elements 508.1 through 508.n to vibrate at the one or more resonant frequencies to generate the multiple noise suppression waves at these resonant frequencies. In some embodiments, the one or more resonant frequencies of the acoustic suppression elements 508.1 through 508.n can be substantially similar to one another to generate the multiple noise suppression waves having substantially similar frequencies to one another. In some embodiments, the one or more resonant frequencies of the acoustic suppression elements 508.1 through 508.n can be different from one another to generate the multiple noise suppression waves having different frequencies to one another. In some embodiments, the one or more resonant frequencies can be within a frequency range, for example, an audible frequency range, such as between approximately 20 Hz and approximately 20 kHz. Generally, the one or more resonant frequencies can be characterized as being based upon volumes of the acoustic suppression elements 508.1 through 508.n. For example, an acoustic suppression element from among the acoustic suppression elements 508.1 through 508.n having a greater volume can be characterized as having a lower resonate frequency than another acoustic suppression element from among the acoustic suppression elements 508.1 through 508.n a having lower volume.

Figure 5B:
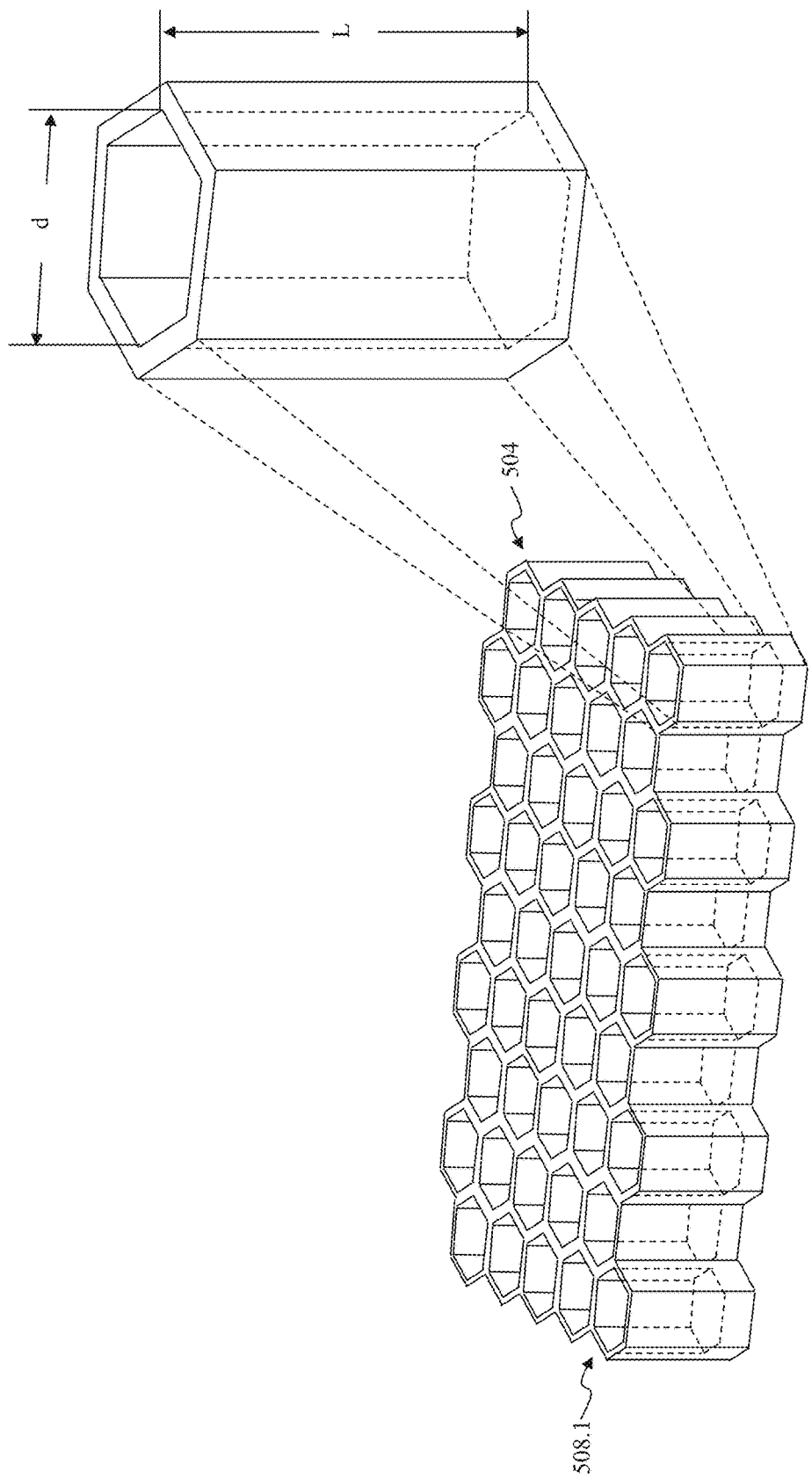
Figure 5C:
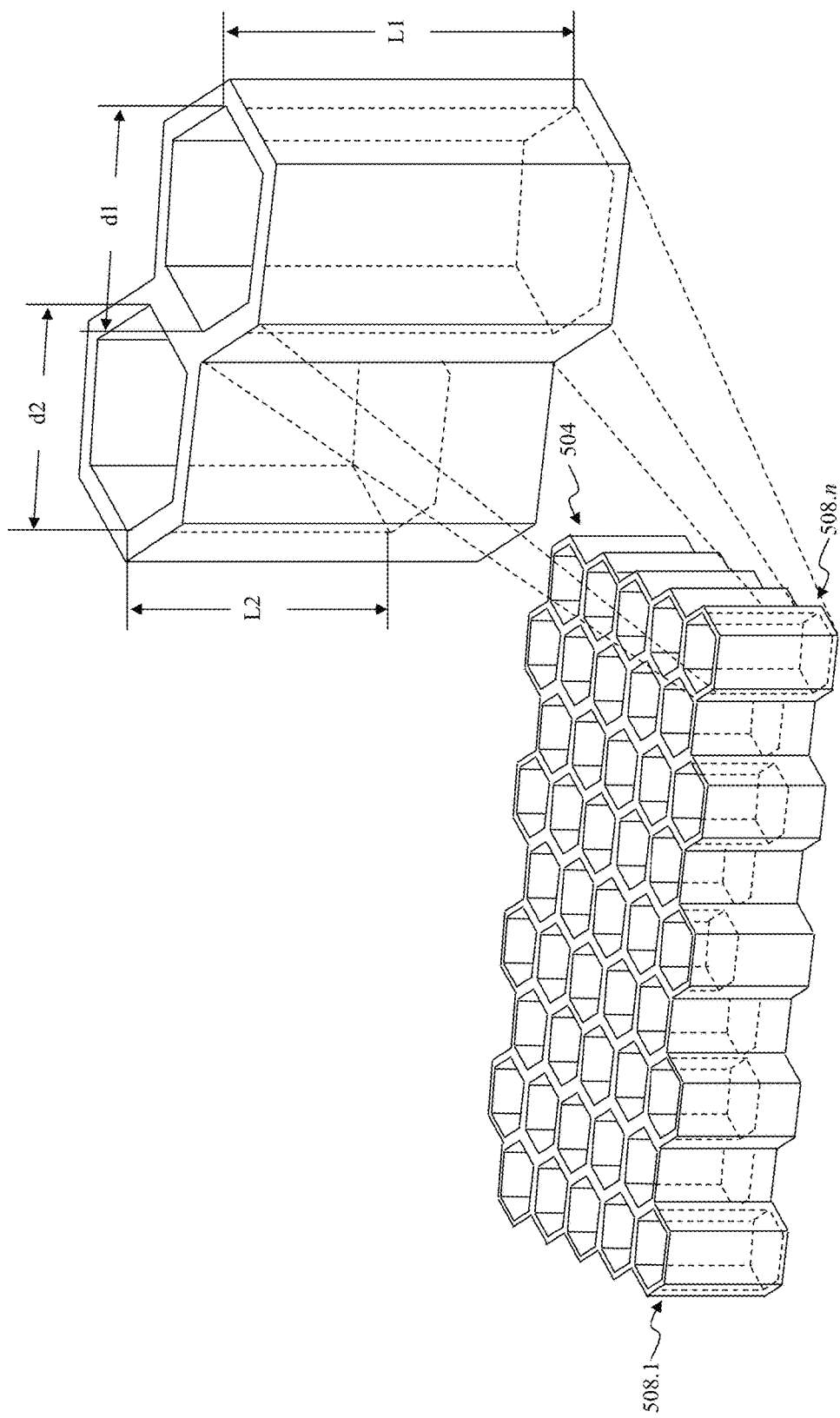

As illustrated in FIG. 5B and FIG. 5C, the volumes of the acoustic suppression elements 508.1 through 508.n can be based upon diameters and/or lengths, or depths, of volumes of the acoustic suppression elements 508.1 through 508.n. As illustrated in FIG. 5B, each of the acoustic suppression elements 508.1 through 508.n can be characterized as having a substantially similar diameter d and/or a length L to one another. As such, the one or more resonant frequencies of the acoustic suppression elements 508.1 through 508.n having substantially similar diameters and/or lengths to one another can generate multiple noise suppression waves having substantially similar frequencies to one another. As illustrated in FIG. 5C, the acoustic suppression elements 508.1 through 508.n can be characterized as having different diameters and/or different lengths from one another to generate multiple noise suppression waves having substantially different frequencies from one another. In an exemplary embodiment, each of the acoustic suppression elements 508.1 through 508.n can be characterized as having a length from among four (4) different lengths. In some embodiments, one of the acoustic suppression elements from among the acoustic suppression elements 508.1 through 508.n can be characterized as having a length L1 that is greater than a length L2 of another acoustic suppression element from among the acoustic suppression elements 508.1 through 508.n. In these embodiments, the acoustic suppression element having the greater length L1 can resonate at one or more lower resonate frequencies then the acoustic suppression element having the lesser length L2 assuming that the diameter d1 is approximately equal to the diameter d2 as illustrated in FIG. 5C.

Figure 5D:
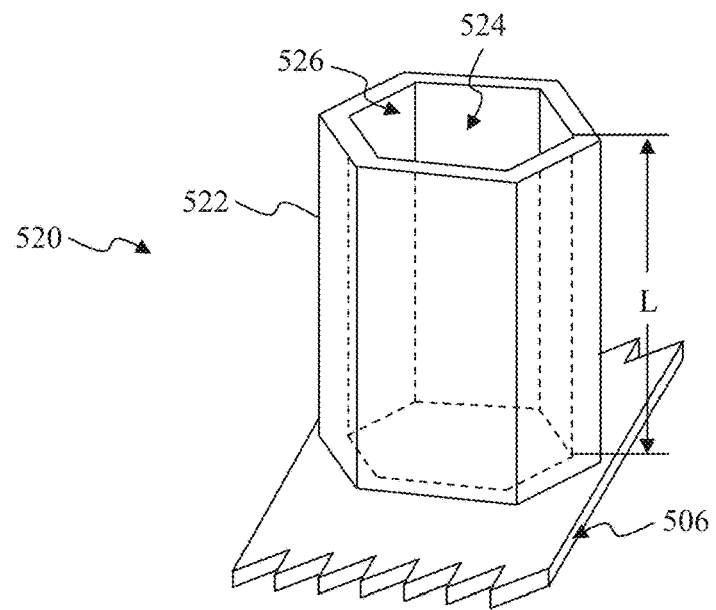

As illustrated in FIG. 5D, an acoustic suppression element 520 from among the acoustic suppression elements 508.1 through 508.$n$ as described above in FIG. 5A through FIG. 5C, can be characterized as including a three-dimensional chamber 522 with a three-dimensional hollow cavity 524 formed therein. In some embodiments, a length L, or depth, of the three-dimensional chamber 522 is substantially similar to a length L, or depth, of the three-dimensional hollow cavity 524. In some embodiments, the three-dimensional chamber 522 and/or the three-dimensional hollow cavity 524 can be implemented as hexagonal prisms. However, those skilled in the relevant art(s) will recognize that the three-dimensional chamber 522 and/or the three-dimensional hollow cavity 524 can be implemented using other three-dimensional can shape, such as cubes, rectangular prisms, cylinders, and/or spheres to provide some examples, without departing from the spirit and scope of the present disclosure. In the exemplary embodiment illustrated in FIG. 5D, the acoustic suppression element 520 includes an opening 526 to allow the high-velocity, high-volume input stream of gas 154 to enter into the three-dimensional hollow cavity 524 with the second outer faceplate 506 enclosing the three-dimensional hollow cavity 524. In some embodiments, the opening 526 can be implemented using regular closed geometric openings, such as ellipses, hexagons, and/or circles to provide some examples. However, those skilled in the relevant art(s) will recognize that the opening 526 can be implemented using other regular closed geometric structures, irregular closed structures, such as one or more irregular polygons to provide an example, and/or any suitable combination of closed structures that will be apparent to those skilled in the relevant art(s) without departing from the spirit and scope of the present disclosure.

Figure 5E:
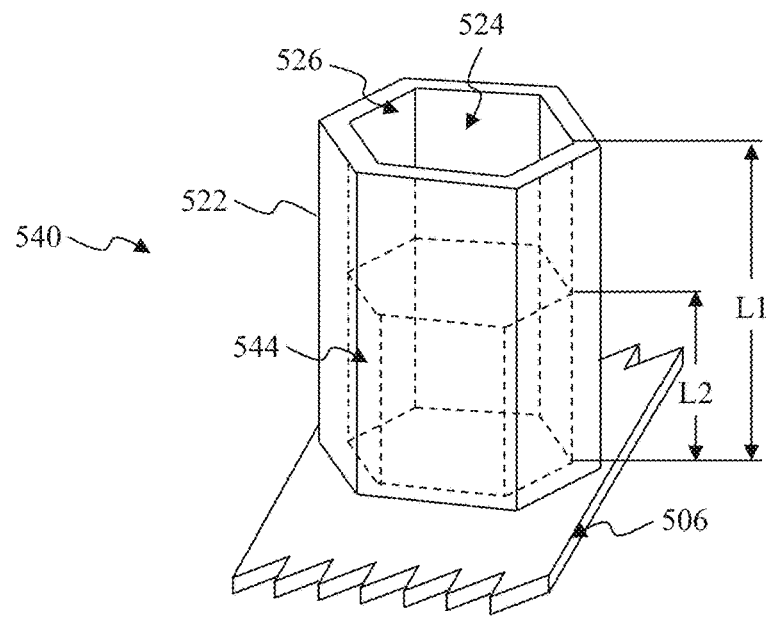

As illustrated in FIG. 5E, an acoustic suppression element 540 from among the acoustic suppression elements 508.1 through 508.$n$ as described above in FIG. 5A through FIG. 5C, can be characterized as including the three-dimensional chamber 522 with the three-dimensional hollow cavity 524 formed therein as described above in FIG. 5D. In some embodiments, a length L1, or depth, of the three-dimensional chamber 522 is substantially similar to a length L1, or depth, of the three-dimensional hollow cavity 524. In the exemplary embodiment illustrated in FIG. 5E, the acoustic suppression element 540 includes the opening 526 to allow the high-velocity, high-volume input stream of gas 154 to enter into the three-dimensional hollow cavity 524 with the second outer faceplate 506 enclosing the three-dimensional hollow cavity 524 in a substantially similar manner as described above in FIG. 5D. Moreover, the acoustic suppression element 540 includes a three-dimensional plug 544 to effectively tune the acoustic suppression element 540 to resonate at one or more different resonant frequencies than the acoustic suppression element 540 as described above in FIG. 5D. In some embodiments, a volume of the acoustic suppression element 540 can be controlled using the three-dimensional plug 544 to tune the acoustic suppression element 540. In these embodiments, a three-dimensional plug 544 having a greater length L2 can be used to cause the acoustic suppression element 540 to resonate at one or more higher resonate frequencies then a three-dimensional plug 544 having a lesser length L2. In some embodiments, the three-dimensional plug 544 can be implemented as a hexagonal prism. However, those skilled in the relevant art(s) will recognize that the three-dimensional plug 544 can be implemented using other three-dimensional shapes, such as cubes, rectangular prisms, cylinders, and/or spheres to provide some examples, without departing from the spirit and scope of the present disclosure. In some embodiments, the acoustic suppression elements 508.1 through 508.$n$ can be implemented using one or more metallic materials, such as iron, steel, copper, bronze, brass, or aluminum to provide some examples, one or more non-metallic materials, such as wood, plastic, or glass, the one or more absorption materials as described above in FIG. 2, and/or any combination thereof.

Exemplary Operation of One of the Active Acoustic Suppression Chambers

Figure 6:
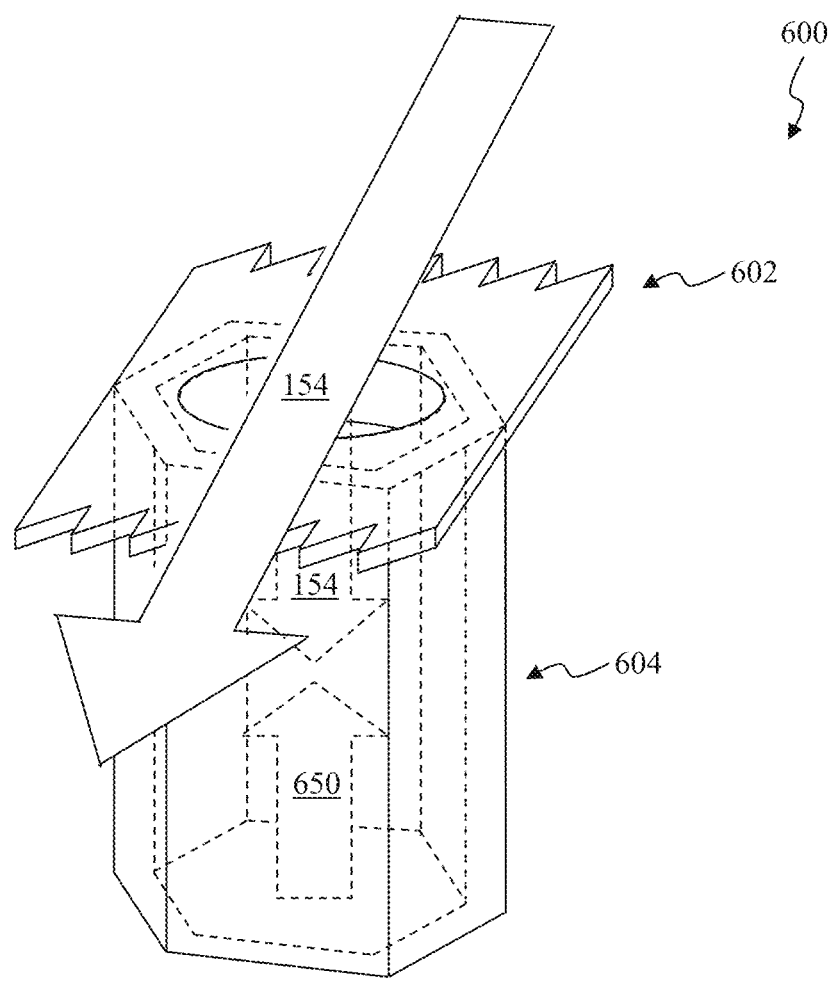
FIG. 6 graphically illustrates an exemplary operation of the second exemplary air guide in accordance with some exemplary embodiments.

FIG. 6 graphically illustrates an exemplary operation of the second exemplary air guide in accordance with some exemplary embodiments. In the exemplary embodiment illustrated in FIG. 6, an air guide 600 can actively suppress the unwanted noise 156 propagating through the air guide 600. As to be described in further detail below, the high-velocity, high-volume input stream of gas 154 can cause the air guide 600 to resonate by, for example, Helmholtz resonance, to generate a noise suppression wave 650. In some embodiments, the noise suppression wave 650 can be characterized being within a frequency range, for example, an audible frequency range, such as between approximately 20 Hz and approximately 20 kHz. The noise suppression wave 650 can destructively combine with the unwanted noise 156 generated by the high-velocity, high-volume input stream of gas 154 to suppress the unwanted noise 156. As illustrated in FIG. 6, the air guide 600 can include a first inner faceplate 602 and an active acoustic suppression chamber 604. In some embodiments, the first inner faceplate 602 can represent one or more portions of the inner faceplate 204 as described above in FIG. 2. In some embodiments, the active acoustic suppression chamber 604 can represent one or more portions of the active acoustic suppression chamber 406 as described above in FIG. 4 and/or the active acoustic suppression chamber 504 as described above in FIG. 5A through FIG. 5E. The noise suppression wave 650 can represent an exemplary embodiment of one or more of the multiple noise suppression waves 450 as described above in FIG. 4.

As illustrated in FIG. 6, the high-volume input stream of gas 154 propagates through the air guide 400, for example, along one or more surfaces of the first inner faceplate 602. In some embodiments, the first inner faceplate 602 can include the one or more perforations as described above in FIG. 2 to allow some of the high-volume input stream of gas 154 to propagate through the first inner faceplate 602 onto the active acoustic suppression chamber 406. Thereafter, the high-volume input stream of gas 154 which propagates through the first inner faceplate 602 can cause the active acoustic suppression chamber 406 to resonate by, for example, Helmholtz resonance, to generate the noise suppression wave 650. In some embodiments, the active acoustic suppression chamber 406 can be effectively tuned to resonate at one or more resonant frequencies. In these embodiments, the active acoustic suppression chamber 406 can include a three-dimensional chamber with a three-dimensional hollow cavity, such as the three-dimensional chamber 522 and the three-dimensional hollow cavity 524 as described above in FIG. 5A through FIG. 5E. In these embodiments, the active acoustic suppression chamber 406 can optionally include a three-dimensional plug, such as the dimensional plug 544 as described above in FIG. 5A through FIG. 5E to provide an example, to tune the active acoustic suppression chamber 406 to the one or more resonant frequencies. In these embodiments, the high-volume input stream of gas 154 which propagates through the first inner faceplate 602 can cause the ambient air within the dimensional hollow cavity to vibrate at the one or more resonant frequencies to generate the noise suppression wave 650 at these resonant frequencies. In some embodiments, these resonant frequencies can be within a frequency range, for example, an audible frequency range, such as between approximately 20 Hz and approximately 20 kHz. In some embodiments, the noise suppression wave 650 can destructively combine with the unwanted noise 156 generated by the high-velocity, high-volume input stream of gas 154 to suppress the unwanted noise 156.

Figure 7A:
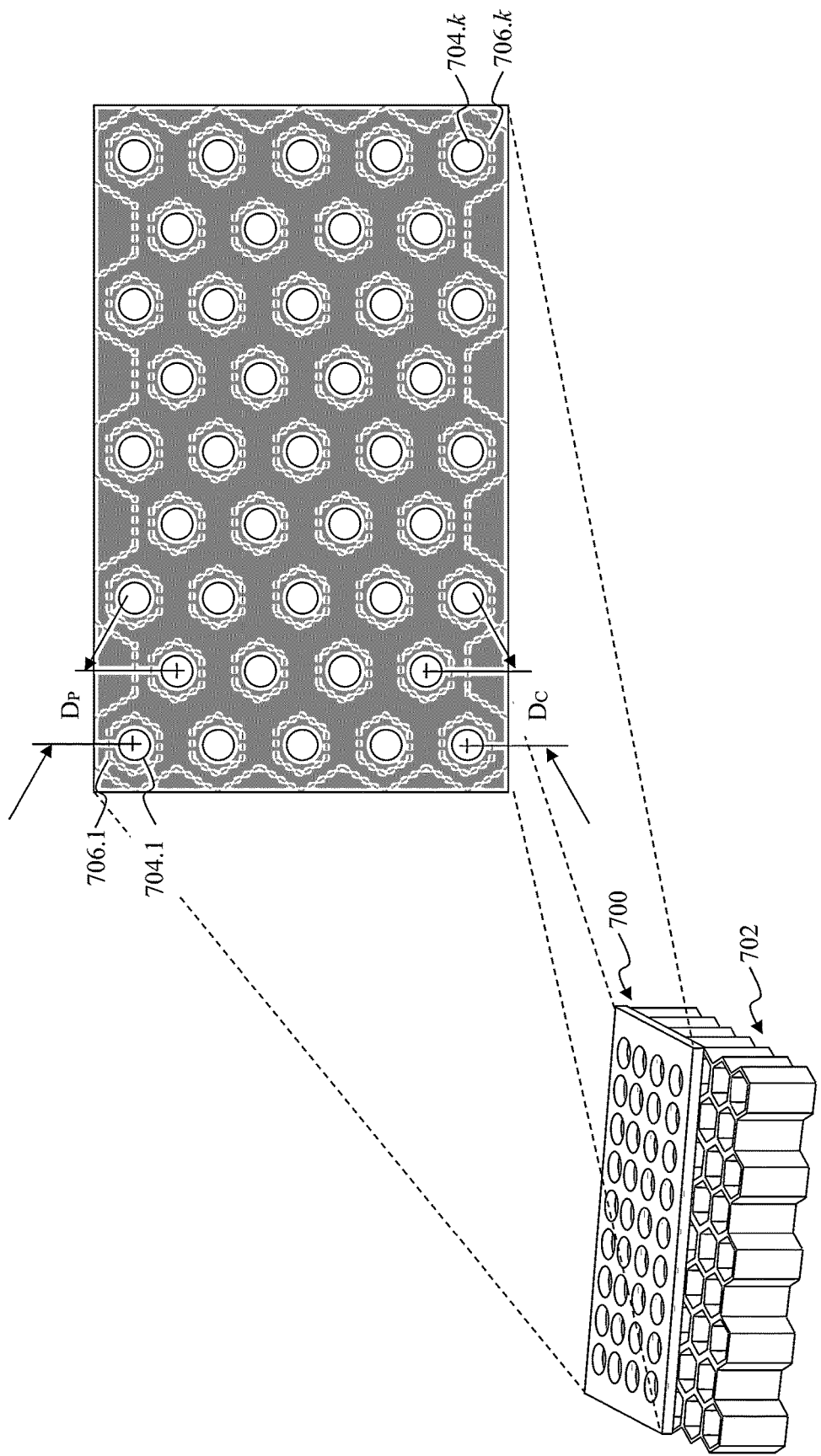
FIG. 7A through FIG. 7C graphically illustrate exemplary first inner face plates that can be implemented within the second exemplary air guide in accordance with some exemplary embodiments.
Figure 7B:
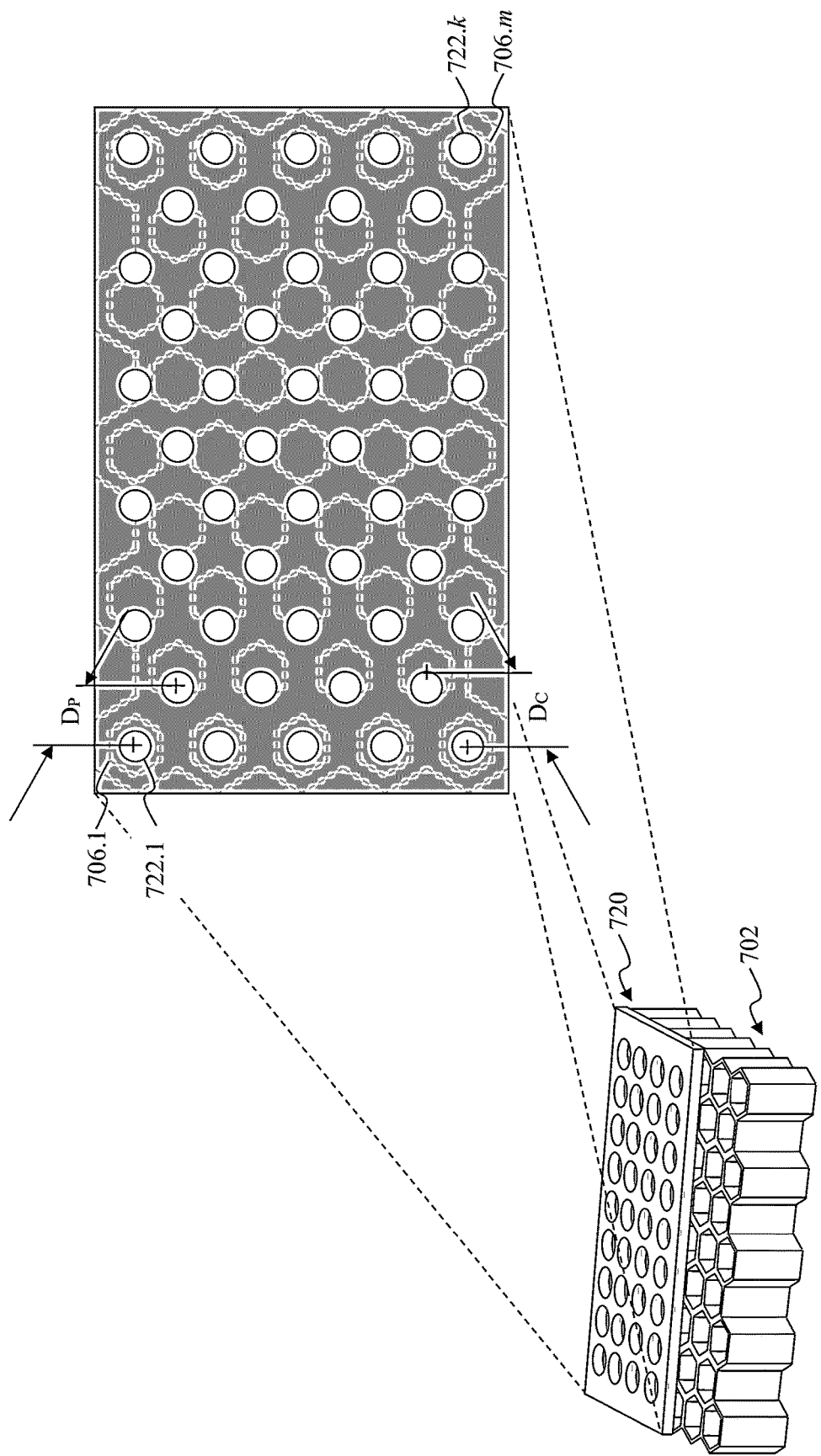
Figure 7C:
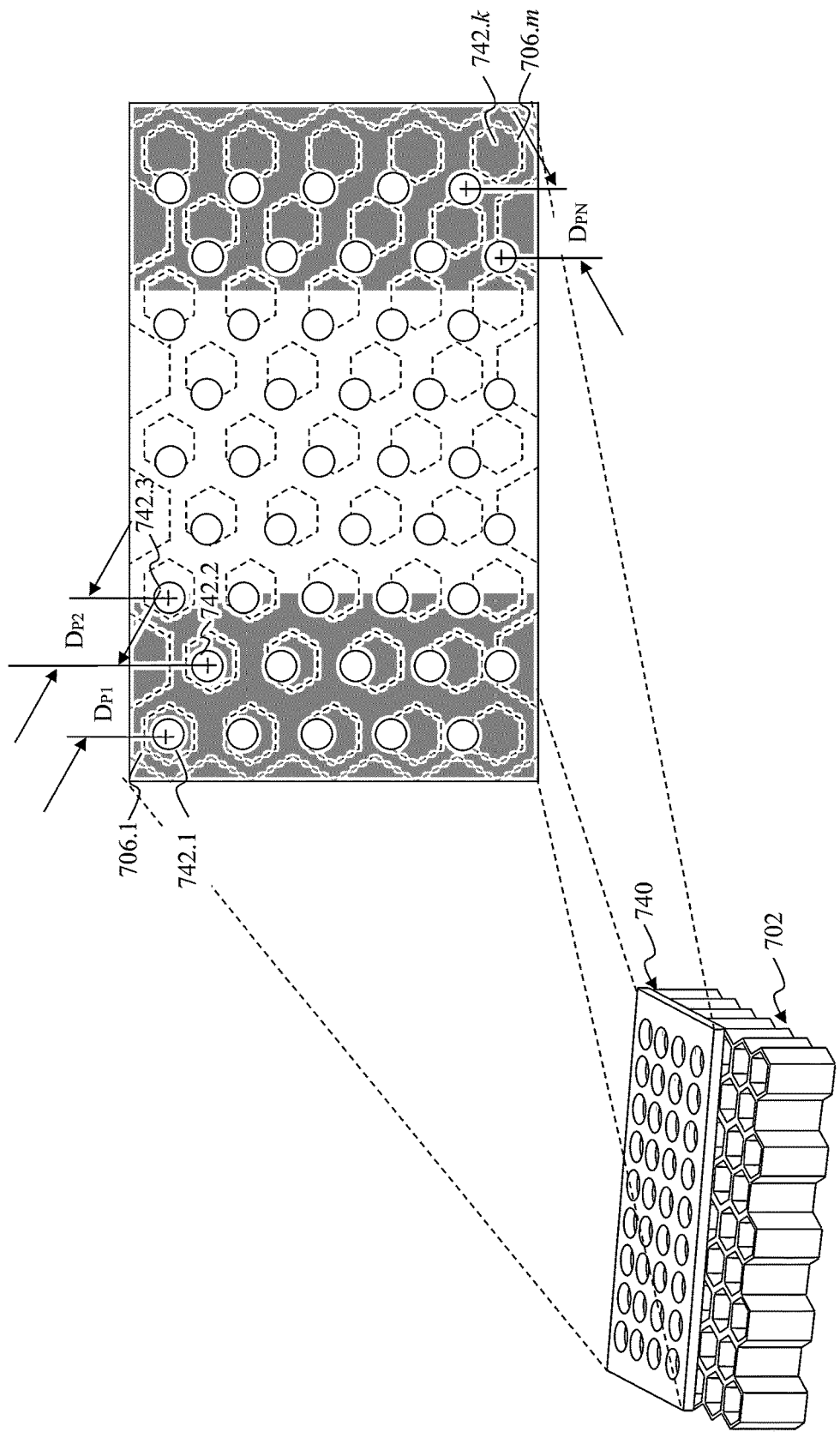

Exemplary First Inner Faceplates that can be Implemented within the Second Exemplary Air Guide FIG. 7A through FIG. 7C graphically illustrate exemplary first inner face plates that can be implemented within the second exemplary air guide in accordance with some exemplary embodiments. As discussed above, the high-velocity, high-volume input stream of gas 154 can propagate along one or more surfaces of a first inner faceplate, such as a first inner faceplate 700 as illustrated in FIG. 7A, a first inner faceplate 720 as illustrated in FIG. 7B, and/or a first inner faceplate 740 as illustrated in FIG. 7C. As to be described in further detail below, the high-velocity, high-volume input stream of gas 154 can propagate through the first inner faceplate onto an active acoustic suppression chamber, such as an active acoustic suppression chamber 702 as illustrated in FIG. 7A through FIG. 7C. The first inner faceplate 700, the first inner faceplate 720, and/or the first inner faceplate 740 can represent exemplary embodiments of the first inner faceplate 204 as described above in FIG. 2, the first inner faceplate 502 as described above in FIG. 5A through FIG. 5E, and/or the first inner faceplate 602 as described above in FIG. 6. The active acoustic suppression chamber 702 can represent an exemplary embodiment of the active acoustic suppression chamber 504 as described above in FIG. 5A through FIG. 5E and/or the active acoustic suppression chamber 604 as described above in FIG. 6.

As illustrated in FIG. 7A, the first inner faceplate 700 can include perforations 704.1 through 704.k to allow some of the high-volume input stream of gas 154 to propagate through the first inner faceplate 602 onto their corresponding three-dimensional chambers 706.1 through 706.m of the active acoustic suppression chamber 702. Although the perforations 704.1 through 704.k are illustrated as being circles in FIG. 7A, those skilled in the relevant art(s) will recognize that the perforations 704.1 through 704.k can be implemented using any regular closed geometric openings, such as ellipses, hexagons, and/or diamonds to provide some examples, within the first inner faceplate 204 without departing from the spirit and scope of the present disclosure. In the exemplary embodiment illustrated in FIG. 7A, the perforations 704.1 through 704.k can be characterized as being uniformly separated from one another by a center-to-center spacing $D_P$ as illustrated in FIG. 7A. As illustrated in FIG. 7A, each perforation from among the perforations 704.1 through 704.k is equidistant from neighboring, adjacent perforation from among the perforations 704.1 through 704.k by the center-to-center spacing $D_P$. Additionally, the corresponding three-dimensional chambers 706.1 through 706.m can be characterized as being separated from one another by a center-to-center spacing Dc as illustrated in FIG. 7A. In the exemplary embodiment illustrated in FIG. 7A, the center-to-center spacing $D_P$ is approximately equal to the center-to-center spacing Dc such that the perforations 704.1 through 704.k centrally align with their corresponding three-dimensional chambers 706.1 through 706.m.

As illustrated in FIG. 7B, the first inner faceplate 720 can include perforations 722.1 through 722.k to allow some of the high-volume input stream of gas 154 to propagate through the first inner faceplate 602 onto their corresponding three-dimensional chambers 706.1 through 706.m of the active acoustic suppression chamber 702. Although the perforations 722.1 through 722.k are illustrated as being circles in FIG. 7B, those skilled in the relevant art(s) will recognize that the perforations 722.1 through 722.k can be implemented using any regular closed geometric openings, such as ellipses, hexagons, and/or diamonds to provide some examples, within the first inner faceplate 204 without departing from the spirit and scope of the present disclosure. In the exemplary embodiment illustrated in FIG. 7B, the perforations 722.1 through 722.k can be characterized as being uniformly separated from one another by the center-to-center spacing $D_P$ as illustrated in FIG. 7B. As illustrated in FIG. 7B, each perforation from among the perforations 722.1 through 722.k is equidistant from neighboring, adjacent perforation from among the perforations 722.1 through 722.k by the center-to-center spacing $D_P$. Additionally, the corresponding three-dimensional chambers 706.1 through 706.m can be characterized as being separated from one another by the center-to-center spacing Dc as illustrated in FIG. 7B. In the exemplary embodiment illustrated in FIG. 7B, the center-to-center spacing $D_P$ is less than the center-to-center spacing Dc such that the perforations 722.1 through 722.k can be characterized as being offset from their corresponding three-dimensional chambers 706.1 through 706.m. Although not illustrated, the center-to-center spacing $D_P$ can be greater than the center-to-center spacing Dc such that the perforations 722.1 through 722.k can be similarly characterized as being offset from their corresponding three-dimensional chambers 706.1 through 706.m.

As illustrated in FIG. 7C, the first inner faceplate 740 can include perforations 742.1 through 742.k to allow some of the high-volume input stream of gas 154 to propagate through the first inner faceplate 602 onto their corresponding three-dimensional chambers 706.1 through 706.m of the active acoustic suppression chamber 702. Although the perforations 742.1 through 742.k are illustrated as being circles in FIG. 7C, those skilled in the relevant art(s) will recognize that the perforations 742.1 through 742.k can be implemented using any regular closed geometric openings, such as ellipses, hexagons, and/or diamonds to provide some examples, within the first inner faceplate 204 without departing from the spirit and scope of the present disclosure. In the exemplary embodiment illustrated in FIG. 7C, the perforations 742.1 through 742.k can be characterized as being variably separated from one another by variable center-to-center spacings $D_P$ in a similar manner as described above. As illustrated in FIG. 7C, each perforation from among the perforations 742.1 through 742.k can be separated from neighboring, adjacent perforation from among the perforations 742.1 through 742.k by a corresponding center-to-center spacing $D_P$ from among center-to-center spacings $D_{P1}$ through $D_{PN}$. For example, as illustrated in FIG. 7C, a perforation 742.1 is separated from its neighboring, adjacent perforation 706.2 by a center-to-center spacing $D_{P1}$ which is separated from its neighboring, adjacent perforation 706.2 by a center-to-center spacing $D_{P2}$. In this example, the center-to-center spacing $D_{P1}$ can be different, for example, less than or greater than, the center-to-center spacing $D_{P2}$ which results in the perforation 742.1 through the perforation 742.3 being variably separated from one another.

CONCLUSION

The Detailed Description referred to accompanying figures to illustrate exemplary embodiments consistent with the disclosure. References in the disclosure to "an exemplary embodiment" or "exemplary embodiments" indicates that the exemplary embodiment(s) described can include a particular feature, structure, or characteristic, but every exemplary embodiment may not necessarily include the particular feature, structure, or characteristic. Moreover, such phrases are not necessarily referring to the same exemplary embodiment. Further, any feature, structure, or characteristic described in connection with an exemplary embodiment can be included, independently or in any combination, with features, structures, or characteristics of other exemplary embodiments whether or not explicitly described.

The Detailed Description is not meant to limiting. Rather, the scope of the disclosure is defined only in accordance with the following claims and their equivalents. It is to be appreciated that the Detailed Description section, and not the Abstract section, is intended to be used to interpret the claims. The Abstract section can set forth one or more, but not all exemplary embodiments, of the disclosure, and thus, are not intended to limit the disclosure and the following claims and their equivalents in any way.

The exemplary embodiments described within the disclosure have been provided for illustrative purposes and are not intended to be limiting. Other exemplary embodiments are possible, and modifications can be made to the exemplary embodiments while remaining within the spirit and scope of the disclosure. The disclosure has been described with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The Detailed Description of the exemplary embodiments fully revealed the general nature of the disclosure that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

What is claimed is:

1. An air amplifier, comprising:
    air amplification engine configured to utilize energy from a high-pressure input stream of gas to accelerate a low-velocity input stream of gas to provide a high-velocity, high-volume input stream of gas; and
    an air guide comprising:
        a first faceplate to form an innermost assembly of the air guide that is situated within the air guide along a longitudinal axis of the air guide, the first faceplate being configured to:
            shape the high-velocity, high-volume input stream of gas as the high-velocity, high-volume input stream of gas propagates through the air guide to provide a high-velocity, high-volume output stream of gas, and
            allow unwanted noise generated by the high-velocity, high-volume input stream of gas to propagate through the first inner faceplate,
        an active acoustic absorption chamber, situated within the air guide along the longitudinal axis of the air guide, having a plurality of acoustic suppression elements that are normal to the longitudinal axis of the air guide, the plurality of acoustic suppression elements being configured to generate a plurality of noise suppression waves that destructively combine with the unwanted noise propagating through the first faceplate, and
        a second faceplate to form an outermost assembly of the air guide that is situated within the air guide along the longitudinal axis of the air guide.

2. The air amplifier of claim 1, wherein the first faceplate comprises a plurality of perforations configured to allow the unwanted noise to propagate through the first faceplate onto the active acoustic absorption chamber.

3. The air amplifier of claim 1, wherein each acoustic suppression element from among the plurality of acoustic suppression elements is staggered from its one or more neighboring, adjacent acoustic suppression elements from among the acoustic suppression elements to form a two-dimensional lattice of acoustic suppression elements.

4. The air amplifier of claim 3, wherein the two-dimensional lattice comprises a rhombic lattice, a square lattice, a rectangular lattice, a parallelogrammic lattice, a triangular lattice, or a hexagonal lattice.

5. The air amplifier of claim 1, wherein the plurality of acoustic suppression elements is configured to vibrate at one or more resonant frequencies to generate the plurality of noise suppression waves at the one or more resonant frequencies that destructively combine with the unwanted noise propagating through the first faceplate.

6. An air guide for an air amplifier, the air guide comprising:
    a first inner faceplate to form an innermost assembly of the air guide that is situated along a longitudinal axis of the air guide, the first inner faceplate having a plurality of perforations configured to allow an unwanted noise generated by a stream of gas as the stream of gas propagates through the air guide to propagate through the first inner faceplate;
    an active acoustic absorption chamber, situated along the longitudinal axis of the air guide, having a plurality of acoustic suppression elements that are normal to the longitudinal axis of the air guide, the plurality of acoustic suppression elements being configured to generate a plurality of noise suppression waves that destructively combine with the unwanted noise propagating through the first inner faceplate; and
    a second outer faceplate configured to form an outermost assembly of the air guide that is situated along the longitudinal axis of the air guide.

7. The air guide of claim 6, wherein each perforation from among the plurality of perforations is implemented using a regular closed geometric opening.

8. The air guide of claim 7, wherein the regular closed geometric opening comprises an ellipse, a hexagon, or a diamond.

9. The air guide of claim 6, wherein each acoustic suppression element from among the plurality of acoustic suppression elements is staggered from its one or more neighboring, adjacent acoustic suppression elements from among the acoustic suppression elements to form a two-dimensional lattice of acoustic suppression elements.

10. The air guide of claim 9, wherein the two-dimensional lattice comprises a rhombic lattice, a square lattice, a rectangular lattice, a parallelogrammic lattice, a triangular lattice, or a hexagonal lattice.

11. The air guide of claim 6, wherein the plurality of acoustic suppression elements is configured to vibrate at one or more resonant frequencies to generate the plurality of noise suppression waves at the one or more resonant frequencies that destructively combine with the unwanted noise propagating through the first faceplate.

12. An air guide for an air amplifier, the air guide comprising:
 a first inner faceplate situated within a hallow cavity of the air guide along a longitudinal axis of the air guide, the first inner faceplate having a plurality of perforations configured to allow an unwanted noise generated by a stream of gas as the stream of gas propagates through the air guide to propagate through the first inner faceplate;
 a second outer faceplate situated along the longitudinal axis of the air guide; and
 an active acoustic absorption chamber situated within the hallow cavity of the air guide along the longitudinal axis of the air guide between the first inner faceplate and the second inner faceplate, the active acoustic absorption chamber having a plurality of acoustic suppression elements that are normal to the longitudinal axis of the air guide, the plurality of acoustic suppression elements being configured to generate a plurality of noise suppression waves that destructively combine with the unwanted noise propagating through the first inner faceplate.

13. The air guide of claim 12, wherein each perforation from among the plurality of perforations is implemented using a regular closed geometric opening.

14. The air guide of claim 13, wherein the regular closed geometric opening comprises an ellipse, a hexagon, or a diamond.

15. The air guide of claim 12, wherein each acoustic suppression element from among the plurality of acoustic suppression elements is staggered from its one or more neighboring, adjacent acoustic suppression elements from among the acoustic suppression elements to form a two-dimensional lattice of acoustic suppression elements.

16. The air guide of claim 15, wherein the two-dimensional lattice comprises a rhombic lattice, a square lattice, a rectangular lattice, a parallelogrammic lattice, a triangular lattice, or a hexagonal lattice.

17. The air guide of claim 12, wherein the plurality of acoustic suppression elements is configured to vibrate at one or more resonant frequencies to generate the plurality of noise suppression waves at the one or more resonant frequencies that destructively combine with the unwanted noise propagating through the first faceplate.

\* \* \* \* \*